June 22, 1965 W. S. KREISMAN 3,190,124
BAKEABLE MCLEOD GAUGE
Filed Nov. 7, 1961 2 Sheets-Sheet 1

INVENTOR
Wallace S. Kreisman,
BY Diggins & Le Blanc
ATTORNEYS

June 22, 1965  W. S. KREISMAN  3,190,124
BAKEABLE MCLEOD GAUGE

Filed Nov. 7, 1961  2 Sheets-Sheet 2

INVENTOR
Wallace S. Kreisman,

BY Diggins & LeBlanc
ATTORNEYS

United States Patent Office 3,190,124
Patented June 22, 1965

3,190,124
BAKEABLE McLEOD GAUGE
Wallace S. Kreisman, Malden, Mass., assignor to Geophysics Corporation of America, Bedford, Mass., a corporation of Delaware
Filed Nov. 7, 1961, Ser. No. 150,690
16 Claims. (Cl. 73—400)

This invention relates to low pressure vacuum gauges and more particularly to a McLeod type vacuum gauge which may be baked at high temperatures for extended periods of time.

A conventional low pressure McLeod gauge is described in an article by Paul Rosenberg in the Review of Scientific Instruments, volume 10, pages 131–134 (April 1939). The conventional McLeod gauge comes in various sizes to cover different pressure ranges. The usual McLeod gauges are accurate in the pressure range from about $10^{-4}$ mm. of mercury to several mm. of Hg. All of the presently known McLeod gauges, however, suffer from several disadvantages which are not readily overcome.

One of the factors which limits the accuracy of the conventional McLeod gauge is the presence of contaminating materials within the gauge structure. Various attempts have been made in the past to decrease this contamination to a minimum but without any marked degree of success. One of these approaches was to degas the glass walls of the gauge by means of a gas torch or electrical heating means. Due to the short time in which a degassing procedure could be performed, the uneven heating of such a degassing step, and for other reasons, the contamination could not substantially reduced.

Another limiting factor of the conventional gauge is the use of either air pressure, $CO_2$ pressure, or a piston-cylinder arrangement to bring the mercury into the gauge from the reservoir. In most of these methods, dirty room air comes in contact with the mercury. The use of these pumping arrangements is undesirable since they cause a large amount of gas to be absorbed in the mercury, and this gas is slowly evolved in the gauge during the measuring procedure, thereby adding to the contamination of the gauge.

Another factor which is of concern during the operation of the gauge is the effect a build-up in the mercury reservoir pressure will have on the gauge. This building up may occur due to atmospheric pressure changes, heating of the reservoir, or the like. Conventional McLeod gauges make no provision for preventing such changes or, should a large pressure change occur, for preventing the mercury from spilling over into the system.

According to the present invention, it has been found that these difficulties may be overcome by using a new bakeable McLeod gauge and mercury reservoir design. The glass portion of the gauge is placed within an oven where it is subjected to heating over a prolonged period of time to reduce contamination to a minimum. The mercury reservoir portion of the gauge is maintained under a vacuum at all times. By the use of this new heating and vacuum principle, far superior performance and measuring characteirstics are obtained. Also, the design of and the material used in the gauge system have been carefully chosen to give a maximum accuracy and little or no contamination.

Accordingly, a primary object of this invention is to provide an improved McLeod type gauge which may be baked at high temperatures for extended periods of time.

Another object of this invention is to provide a McLeod type gauge having a mercury reservoir which is kept under a vacuum at all times.

Yet another object of this invention is to provide an improved gauge fitting process and arrangement.

A further object of this invention is to provide a McLeod gauge having a high vacuum conductance safety reservoir and splatter baffle.

A still further object of this invention is to provide a McLeod type gauge which is compact in size, thereby requiring a minimum size heating oven.

These and further objects and advantages of the invention will become more apparent upon reference to the following description and claims and the appended drawings wherein:

Figure 1:
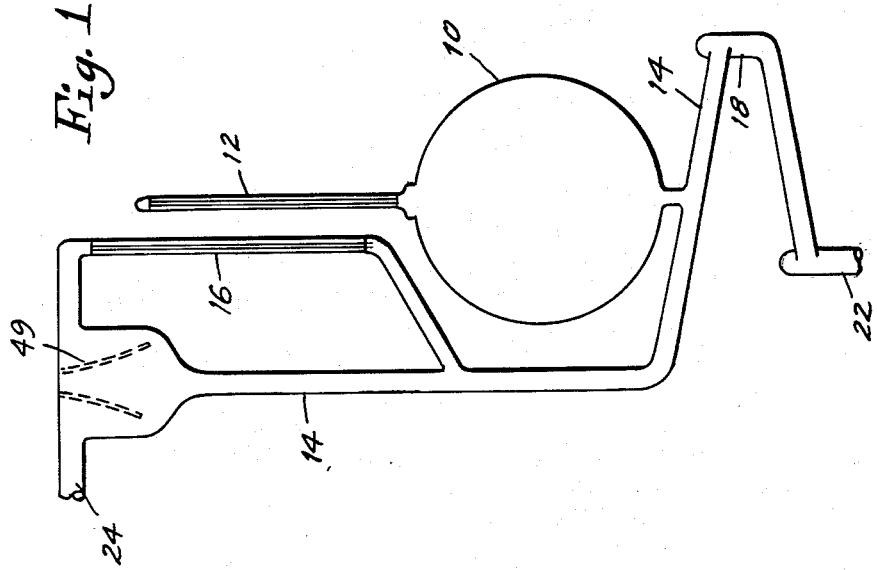
FIGURE 1 shows the low pressure portion of the gauge.

In reference to FIGURE 1, the compression bulb 10 is attached to a measuring capillary tube 12. The volume of the bulb 10 and capillary tube 12 are chosen so that the desired ratio of compression may be obtained. Also connected to the compression bulb 10 is a mercury supply tube 14. A capillary comparison tube 16 is also connected to the supply tube. The capillary tubes 12 and 16 are located adjacent one another so that a comparative reading may be made at the same time.

The supply tube 14 is provided with an expansion bend 18. This expansion bend in the supply tube 14, which is normally made of glass, is necessary to release strains that might be set up during baking.

Figure 2:
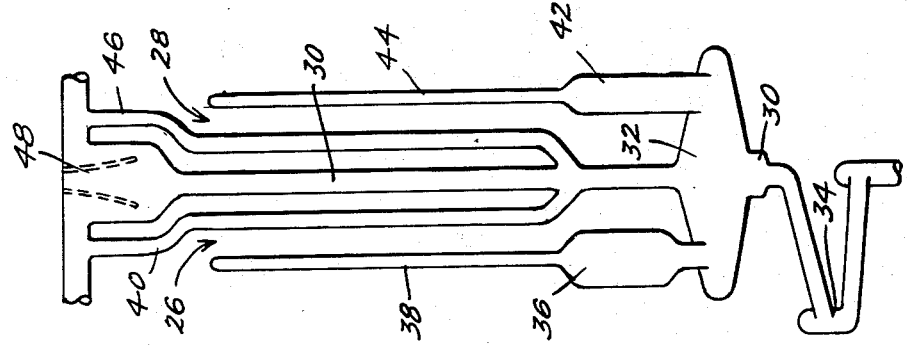
FIGURE 2 shows the medium and high pressure portions of the gauge constructed as a single unit.
Figure 3:
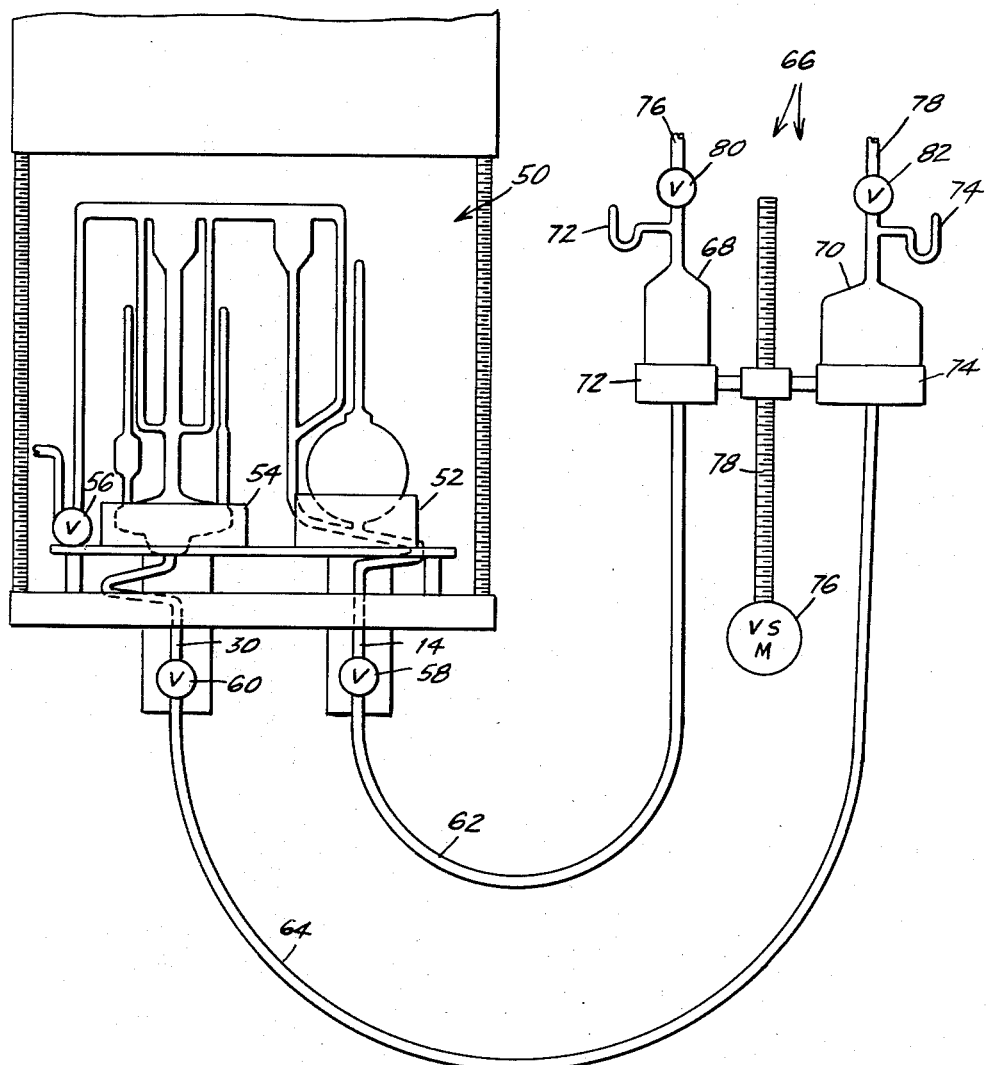
FIGURE 3 shows the various gauge mountings, mercury reservoirs, and improved gauge fitting process and arrangement.

The end 22 of the supply tube 14 is adapted to be connected to the stainless steel grease-free mercury cut-off valve 58 as more clearly shown in FIGURE 3. The end 24 of tube 14 is connected to the vacuum system together with the pumping tubulation of the dual medium and high pressure gauges shown in FIGURE 2.

In FIGURE 2, the dual medium and high pressure McLeod gauges 26 and 28, respectively, are combined in a single unit and are joined to the mercury supply tube 30 by a common chamber 32. The mercury supply tube 30 is provided with an expansion bend 34 which is constructed in susbtantially the same manner as was the expansion bend 18 of FIGURE 1.

The medium pressure gauge 26 is constructed of a compression bulb 36 having a measuring capillary tube 38 joined thereto. Located adjacent the capillary tube 38 is a comparison capillary tube 40 which is joined to the tube 30.

The high pressure gauge 28 consists of a compression bulb 42 which is connected to a measuring capillary tube 44. Located adjacent the capillary tube 44 is a second comparison capillary tube 46 which is also joined to the tube 30.

Located at the extreme upper end of the tube 30 is a specially designed high vacuum conductance safety trap and splatter baffle 48. The presence of this trap and splatter baffle is necessary to protect the gauge from damage should the mercury reservoir be accidentally subjected to a high pressure during operation of the gauge. If this trap and splatter baffle were not present, a sudden increase in the pressure within the mercury reservoir would force the mercury over into the system, thus causing considerable damage. This spilling over is prevented, however, by using the safety reservoir and splatter baffle of the present invention. A similar safety trap and splatter baffle 49 is aslo provided for mercury supply tube 14 of the low pressure gauge.

In FIGURE 3, the various gauges are shown mounted inside an oven 50 which is adapted to heat the gauges at temperatures as high as 450° C. for an extended period of time. The various gauges are supported in metal boxes 52 and 54 which are lined with a plaster type substance to support and protect the gauges. Also located within the oven 50 is a bakeable ultra-high vacuum valve 56 which is used to separate the McLeod gauge from the rest of the vacuum system (not shown).

Secured to the bottom of the oven 50 are two cut-off valves 58 and 60 which are preferably of a stainless steel grease-free type. The valves 58 and 60 are connected eventually to the mercury tubes 14 and 30 respectively. The input ports of the valves are connected to flexible hoses 62 and 64. These flexible tubes join the reservoir 66 to the gauge proper and may be constructed of stainless steel, inert plastics such as teflon, or any other good vacuum material that is flexible.

The reservoir portion 66 of the gauge consists of two mercury reservoirs 68 and 70. These reservoirs are supported on aluminum holders 72 and 74. A motor drive means 76 is adapted to operate through a screw type lift 78 to raise and lower the aluminum reservoir holders. The motor 76 is preferably of the variable speed reversible type so as to permit rapid measurement to be made and still permit fine adjustments of the mercury reservoir positions. Obviously, other types of drive such as a hydraulic drive, a compressed air drive, or other means, could be used in place of the motor 76.

Connected to the mercury reservoirs 68 and 70 are glass, closed end mercury manometers 72 and 74 which constantly monitor the vacuum within the reservoirs. Any leakage in the reservoirs is easily detected by these manometers 72 and 74. Mercury may be added to or removed from the reservoirs through tubes 76 and 78 which are connected to valves 80 and 82. Any gas within the reservoirs may also be pumped out through these tubes and valves. The valves 80 and 82 are preferably of the stainless steel type. The mercury reservoirs themselves may be constructed of stainless steel, glass or any other suitable material.

The operation of the bakeable ultra-high vacuum gauge may be explained substantially in the following manner. The oven 50 is heated at about 450° C. for a long period of time (10 to 20 hours) as is required to reach the ultra-high vacuum region. During this baking period, the mercury cut-off valves 58 and 60 are closed, thereby isolating the mercury from the gauge system. By isolating the mercury with the cut-off valves and baking the gauge for a long period of time at a high temperature, materials condensed on the gauge walls and contaminations (from either the mercury or the gases being measured) that can be vaporized are removed. With these materials removed, measurements can now be made with the gauge in a known condition.

After the baking period, the mercury cut-off valves 58 and 60 are opened, allowing the mercury from the reservoirs 68 and 70, which have been placed under a high vacuum prior to the opening of the valves, to enter the gauge compression bulbs so that a pressure measurement can be made in the normal fashion. The mercury is brought into the compression bulbs by raising the reservoirs. After the measurement has been made, the reservoirs are lowered, and the mercury leaves the compression bulbs and enters the reservoirs. The rate at which mercury enters or leaves the compression bulbs can be controlled by adjusting the valves 58 and 60. By lowering the reservoirs below the mercury cut-off valves 58 and 60, these valves may be closed and the mercury once again isolated from the gauges. Even should the gauges be exposed to contaminating material, as is often the case during changeover from one test to another, the fact that the mercury within the reservoirs is continually under vacuum insures that no contaminating material or gases such as unfiltered air, $CO_2$, etc. can come in contact with the mercury. This isolation feature reduces substantially the likelihood of any foreign solid particles, vapors or other such contaminants reaching the mercury. This vacuum within the mercury reservoirs also assures that the gauge will operate independent of any change in atmospheric pressure.

It will be apparent from the foregoing that the device of this invention substantially reduces the possibilities of any contaminating material being present within the gauge prior to, or being introduced into the gauge during, the pressure measuring process. The operation of the system so that the mercury is maintained under a vacuum at all times also substantially reduces the possibility of contamination occurring due to materials absorbed or located within the mercury. The use of the grease-free mercury cut-off valve also insures greater accuracy. The minimum oven size is also substantially reduced and the pressure measurement range extended by the use of the plural gauge arrangement. Thus, as can be seen, a McLeod gauge constructed in accordance with this invention is a far superior gauge which is easier to operate and has a higher accuracy than heretofore known gauges.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vacuum gauge of the McLeod type comprising compression bulb means, measuring capillary tube and comparison capillary tube means connected to said compression bulb means, means for connecting said compression bulb means to a fluid reservoir means, said reservoir means being maintained under a vacuum, and valve means connected in said connecting means whereby the compression bulb means and reservoir means may be isolated from one another and the fluid flow controlled.

2. A vacuum gauge as recited in claim 1 wherein oven means is provided for heating at least the compression bulb and capillary tube means.

3. A vacuum gauge as recited in claim 2 wherein the oven means substantially surrounds at least the compression bulb and capillary tube means.

4. A vacuum gauge as recited in claim 1 wherein said reservoir means is operated by variable speed motor means.

5. A vacuum gauge as recited in claim 4 wherein said motor means is reversible.

6. A vacuum gauge as recited in claim 1 wherein said compression bulb means is connected to a safety trap and splatter baffle for preventing damage to the gauge should a pressure build up occur.

7. A vacuum gauge assembly comprising a first, second and third McLeod gauge for covering different pressure ranges, each of said gauges consisting of a compression bulb, a measuring capillary tube, a comparison capillary tube, and a safety trap and splatter baffle, an oven housing completely surrounding said first, second and third gauges, means for heating said oven whereby said gauges are baked, means for connecting said gauges to a system to be tested, and means extending through said housing for connecting said gauges to fluid reservoir means.

8. A vacuum gauge assembly as recited in claim 7 wherein said second and third McLeod gauges are connected together by a common chamber.

9. A vacuum gauge assembly as recited in claim 7 wherein said means for connecting said gauges to a system to be tested includes a bakeable valve.

10. A vacuum gauge assembly as recited in claim 7 wherein said means extending through said housing includes at least one valve means for isolating said gauges from fluid reservoir means and controlling the rate of fluid movement.

11. A vacuum gauge assembly as recited in claim 7 wherein said gauges are provided with expansion means for releasing strain exerted upon said gauges when they are baked.

12. A vacuum gauge assembly as recited in claim 7 wherein said gauges are supported in plaster molds.

13. A vacuum gauge for measuring low pressure comprising gauge means, means for connecting said gauge means to a source of vacuum to be measured, reservoir means consisting of fluid container means, holder means for said container means, motor means for raising and lowering said holder means, said fluid container means having inlet and outlet means, valve means connected to said inlet means for adding or removing material from said container, flexible connector means connected between said outlet means and said gauge means, and a valve means connected in said connector means for isolating said gauge means from said outlet means and for controlling the rate of flow of fluid.

14. A vacuum gauge assembly according to claim 13 wherein said fluid container means has vacuum responsive gauge means connected thereto for indicating the vacuum within said container means.

15. A vacuum gauge assembly comprising a first, second and third McLeod gauge for operating over different pressure ranges, each of said gauges consisting of a compression bulb, a measuring capillary tube, and a comparison capillary tube, said second and third gauges being connected together by a common chamber, a safety trap and splatter baffle connected to each of said first and said second and third gauges, an oven housing completely surrounding said gauges, means for heating said oven so that said gauges are baked, a bakeable valve connected to the gauges and located within said oven for connecting the gauges to a system to be tested, a first outlet expansion bend connected to said first gauge, a second outlet expansion bend connected to said common chamber, said expansion bends having an extended portion passing through said oven housing, a first valve connected to said extended portion of said first bend, a second valve connected to said extended portion of said second bend, a first and second mercury container having an inlet and outlet connection, a holder for each of said fluid containers, a variable speed reversible motor drive means for raising and lowering said holders, a vacuum indicator means connected to each of said containers, a valve connected to each of said inlet connections for maintaining said container under a vacuum, a first flexible fluid conductor connected between said first valve and said first mercury container and a second flexible fluid conductor connected between said second valve and said second mercury container so that raising and lowering of said holders will cause mercury to flow into said gauges, thereby causing said gauges to give a pressure reading.

16. A vacuum gauge for measuring low pressure comprising gauge means, an oven, means for substantially enclosing said gauge means in said oven, means for connecting said gauge means to a source of vacuum to be measured, a reservoir of fluid for said gauge means disposed remotely therefrom, means including at least a valve and a flexible line connecting said reservoir to said gauge means whereby said fluid may be prevented from entering said gauge means during enclosure of said gauge by said oven, and means for continuously preventing the entry into said reservoir of gases external thereto.

References Cited by the Examiner
UNITED STATES PATENTS 2,584,945  2/52  Todd _____ 73—400

OTHER REFERENCES

"An Accurate High Sensitivity Apiezon Oil McLeod Gauge," by J. Bannon, Review of Scientific Instruments, volume 14, Number 1, January 1943 (pages 6–10).

Bulletin entitled, "New Opened End McLeod Gauge," by Monostat Corporation, 26 N. Moore Street, New York 13, N.Y., received in the Patent Office June 6, 1960. (Involves a single sheet printed on both sides.)

RICHARD C. QUEISSER, *Primary Examiner.*

ROBERT L. EVANS, *Examiner.*

UNITED STATES PATENT OFFICE
CERTIFICATE OF CORRECTION

Patent No. 3,190,124                                                   June 22, 1965

Wallace S. Kreisman

It is hereby certified that error appears in the above numbered patent requiring correction and that the said Letters Patent should read as corrected below.

Column 1, line 12, after "time." insert the following:

> The invention described herein was made in the performance of work under a NASA contract and is subject to the provisions of Section 305 of the National Aeronautics and Space Act of 1958, Public Law 85-568 (72 stat. 435; 42 U.S.C. 2457).

Signed and sealed this 22nd day of March 1966.

(SEAL)
Attest:

ERNEST W. SWIDER                                     EDWARD J. BRENNER
Attesting Officer                                             Commissioner of Patents